United States Patent [19]

Poppelreiter, II

[11] Patent Number: 4,543,517

[45] Date of Patent: Sep. 24, 1985

[54] ELECTRONIC POSITION AND VELOCITY CONTROL SYSTEM WITH COLD START COMPENSATION

[75] Inventor: Joseph C. Poppelreiter, II, Dearborn, Mich.

[73] Assignee: Kubik, Incorporated, Troy, Mich.

[21] Appl. No.: 412,539

[22] Filed: Aug. 30, 1982

[51] Int. Cl.[4] .................. G05D 23/19; G05B 13/00
[52] U.S. Cl. ..................................... 318/632; 318/561
[58] Field of Search ............. 318/632, 634, 663, 561, 318/467, 282

[56] References Cited

U.S. PATENT DOCUMENTS

| | | | |
|---|---|---|---|
| 3,428,791 | 2/1969 | Chandos | 318/561 X |
| 3,672,246 | 6/1972 | Prewett, Jr. et al. | 82/2 |
| 3,755,726 | 8/1973 | Knipe | 318/663 X |
| 4,031,442 | 6/1977 | Poppelreiter | 318/663 X |
| 4,052,642 | 10/1977 | Speth | 318/561 |
| 4,121,265 | 10/1978 | Derc | 318/634 |
| 4,122,379 | 10/1978 | Richter et al. | 318/634 |
| 4,262,239 | 4/1981 | Kawa | 318/632 X |
| 4,362,978 | 12/1982 | Pollard | 318/632 X |

Primary Examiner—William M. Shoop, Jr.
Assistant Examiner—Patrick C. Keane
Attorney, Agent, or Firm—Basile, Weintraub & Hanlon

[57] ABSTRACT

An electronic system for controlling the extent of motion in the start and stop positions of a hydraulically driven member includes cold start compensation. The driven member is equiped with a voltage sensitive circuit which provides a voltage indicative of the position of the driven member along its path of motion. The position indicative voltage is compared with reference voltages and the resulting comparison voltages actuate switching circuitry to effect changes in the acceleration and deceleration of the driven member and to control the start and stop positions of the driven member. Hydraulic or mechanical apparatus. responsive to the switching circuitry controls the motion extend and velocity of the driven member in accordance with the comparison voltages. A cold start compensation circuit is associated with one of the reference voltages and is operative for a predetermined period of time after energization of the system to incrementally vary one of the reference voltages so as to incrementally vary the location of the movable member at which deceleration is started.

4 Claims, 5 Drawing Figures

ELECTRONIC POSITION AND VELOCITY CONTROL SYSTEM WITH COLD START COMPENSATION

BACKGROUND OF THE INVENTION

1. Field of the Invention

This invention relates, in general, to position and velocity control systems and, more specifically, to controllers for changing the velocity of a movable member at selected locations along a path of movement.

2. Description of the Prior Art

In industrial applications, controllers have been devised for accurately controlling the travel extent and velocity of a member driven along a predetermined path. In such applications, it is necessary to start and stop the member at precise locations and to decelerate the member at appropriate points to assure that the desired stop point is not overshot. For this reason, virtually all prior art systems accelerate the driven member at selected rate until a maximum velocity of relative motion is attained. The relative velocity then remains constant until the selected location is reached along the path of movement at which time the moving member is decelerated until a minimum velocity is reached. Motion continues at the minimum velocity until the desired stop point is reached. The acceleration phase is used so that the driven member is gradually brought up to speed without undue strain on the system while overcoming the inertia of the driven member. The constant speed phase is selected in accordance with the maximum speed permissible for the particular system and operation to increase production efficiency. The deceleration phase is used to gradually stop the driven member and to prevent overshoot and thus, increase the accuracy of the system.

A typical controller for use in the above-described applications is disclosed in U.S. Pat. No. 4,031,442. This controller includes voltage sensitive means which provides a voltage indicative of the position of the driven member along its path of motion. The position indicative voltage is compared with reference voltages and the resulting comparison voltages are used to actuate switching circuitry to effect changes in the travel speed of the driven member and to control its start and stop positions.

While such a controller is effective in accurately controlling the travel velocity of a driven member along a path of movement, problems are encountered during initial start-up of the hydraulic or mechanical control apparatus which actually propells the driven member along its path of movement. As is well known, all hydraulic and mechanical apparatus go through a warm-up period after intial start-up or restart after a lengthy off time in the control fluids, lubricating oils, etc., undergo a temperature rise to normal operating temperatures. During the start up period, the response time of the hydraulic and/or mechanical control devices is slower than normal which causes the hydraulic and mechanical control apparatus to respond slowly to control signals for changing the velocity of the driven member during acceleration and deceleration periods.

The slower response time results in a longer deceleration period which causes the movable member to have considerable momentum a higher velocity than desirable when it reaches its final stop position. This results in the sudden stop of the driven member which could damage to the hydraulic and mechanical apparatus or the load carried by the driven member.

Thus, is would be desirable to provide a position and velocity control system which overcomes the problems of previously devised control system during initial start up or restart. It would also be desirable to provide a position and velocity control system which compensates for the slower response time of the hydraulic and/or mechanical drive mechanism during initial start up and restart. Finally, it would be desirable to provide a position and velocity control system which smoothly decelerates a driven member to a minimum velocity prior to reaching the final stop point along a path of movement despite the slower response time of the hydraulic and/or mechanical drive mechanism during initial start up and/or restart.

SUMMARY OF THE INVENTION

There is disclosed herein a new and improved system for controlling the extent of movement of a movable member with respect to a fixed member and for effecting velocity changes at arbitrarily selected locations along the path of movement of the movable member. The movable or driven member is equipped with voltage sensitive means which provides a voltage indicative of the position of the member along its path of movement. The position indicative voltage is compared with reference voltages and the resulting comparison voltages actuate switching circuitry to effect changes in the acceleration and/or deceleration of the movable member and to control the start and stop positions of the movable member. Hydraulic or mechanical apparatus responsive to the switching circuitry controls the motion extent and velocity of a driven member in accordance with the comparison voltages.

The system further includes a cold start compensation circuit which is associated with one of the reference voltages and is operative for a predetermined period of time after the energization of the control system. The cold start compensation circuit incrementally varies one of reference voltages so as to incrementally vary the point on the path of movement of the movable member which deceleration is initiated.

The position and velocity control system with cold start compensation of the present invention overcomes many of the deficiencies which exist in previously devised velocity control systems by compensating for the slower response time of the hydraulic or mechanical drive apparatus during initial start up or restart. The cold start compensation circuit automatically advances the deceleration point of the movable member along its path of movement and increments the deceleration point as the system cycles until the final normal deceleration point is reached when the system is at normal operating temperatures and conditions. By advancing the deceleration point ahead of the normal deceleration point, the cold start compensation circuit compensates for the slower response time of the hydraulic or mechanical drive apparatus during initial start up or restart of the system. In this manner, the driven member is decelerated to a minimum velocity before it reaches its final stop point thereby effectively eliminating banging of the system which occurs when the driven member reaches the final stop with higher velocity and momemtum than normal. By compensating for the slower response time, damage to the control system and the driven member or work load is also eliminated.

BRIEF DESCRIPTION OF THE DRAWING

The various features, advantages and uses of the present invention will become more apparent by referring to the following detailed description and drawing in which.

DESCRIPTION OF THE PREFERRED EMBODIMENTS

Figure 1:
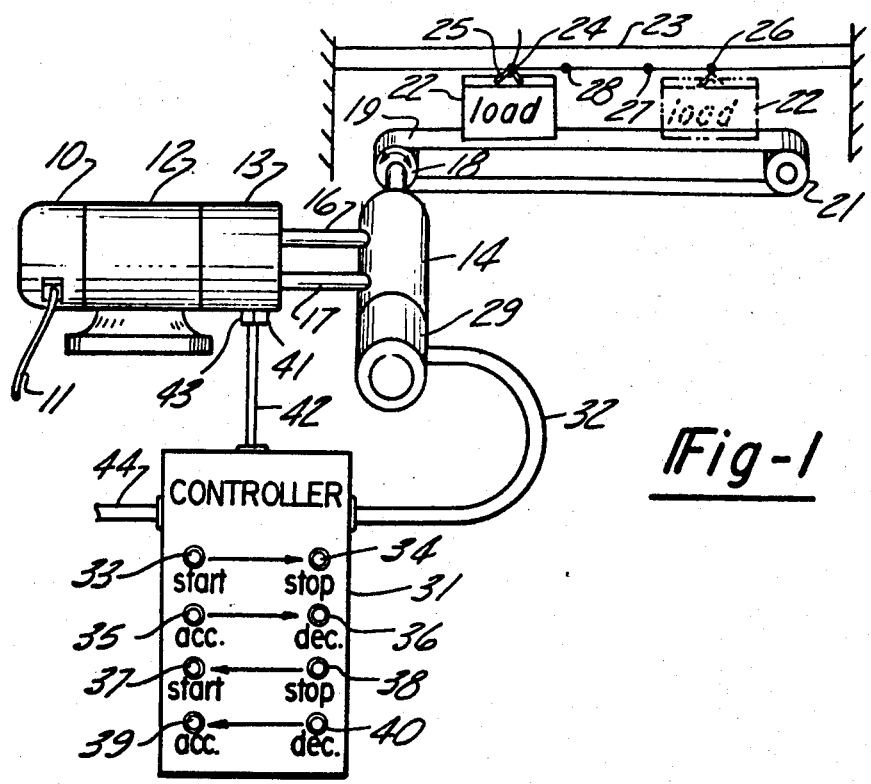
FIG. 1 is a pictorial representation of a typical environment in which the position and velocity control system of the present invention can be employed.

Throughout the following description and drawings, an identical reference number is used to refer to the same component shown in multiple figures of the drawing.

Referring now to the drawing, there is illustrated an electronic position and velocity control system with cold start compensation.

The environment in which the inventive control circuit may be employed can be best understood by making reference to FIG. 1. FIG. 1 shown a constant speed electric motor 10 which is energized by an AC or DC supply by way of input leads 11. An electric motor 10 drives a hydraulic pump 12 so that fluid is provided by the pump to a fluid flow varying mechanism 13. The pump 12 can be either a constant or a variable speed; however, control of the speed pump of a driven member is obtained from the fluid flow varying mechanism 13. Fluid is supplied from the mechanism 13 to a hydraulic motor 14 by way of input conduits 16 and 17. The hydraulic motor 14 will rotate in one direction, e.g., clockwise, when fluid is supplied through the conduit 16 and the other direction, e.g., counter-clockwise, when fluid is supplied by way of conduit 17. The rotation of hydraulic motor 14 rotates a gear member 18 resulting in the linear motion of a belt or chain 19. An idler gear 21 is also associated with the belt or chain 19 to provide for constant linear motion, the direction of which is dependent upon the direction of rotation of the gear 18.

Coupled to belt 19 is a load 22 which moves linearly along with the belt 19. The load 22 therefore moves relative to a fixed member 23. In practice, the load 22 can be a working tool such as a cutting tool, or other member, and fixed element 23 can be the stock upon which the work is being performed. Alternatively, if desired, the load 22 can be member upon which the work is being performed and the fixed member 23 can be the working tool. In either event, the primary function of the inventive system is to control the linear motion of the load 22 from a first position 24 to a second position 26 and to then subsequently reverse the motion so that the load 22 will return to the initial position 24. The present invention provides for deceleration of the velocity of load 22 at a preselected point 27 so that the inertia of the load does not cause over-shoot of the stop point 26.

Because the electric motor 10 and the hydraulic pump 12 sometimes run at constant speed and because controlling fluid flow to motor 14 by changing the speed of electric motor is too slow because of the response time, control of the direction and velocity of rotation of hydraulic motor 14 is effected by controlling the fluid flow from the fluid varying mechanism 13. This is accomplished in a known manner by an element called a swash plate. The swash plate is angularly disposed with respect to the orifices leading to conduits 16 and 17 so that as the angle of the swash plate changes, the volume of fluid flow to the input orifice is varied by the angle of the swash plate. Fluid from the motor 14 returns to fluid mechanism 13 by way of the other orifices accordingly, the angular disposition of the swash plate determines which of the conduits 16 and 17 serves as the input conduit to thereby control the direction of rotation of the hydraulic motor 14. Also, because the angular disposition of the swash plate changes the fluid flow to the motor 14, the speed of the motor 14 is varied simply by varying the angular disposition of the swash plate.

The indentive control system generates position indicative signals which energize control circuitry. The control circuitry actuates a mechanical mechanism to effect changes of the angular disposition of the swash plate so that the load 22 is controllably moved with respect to the fixed number 23. The relative velocity of the two members is decelerated at a preselected point 27. The control system then permits the reversal of motion of the load so that deceleration of the reverse direction motion occurs at a second preselected point 28 and the load 22 accurately stops at point 24 where motion in the forward direction can subsequently begin.

Position indicative signals which control the motion of load 22 are generated by a signal sending unit 29. The signals from sending unit 29 are coupled to a controller 31 by way of cabling 32.

The sending unit 29 includes a potentiometer so that the voltage across the potentiometer is indicative of the position of the load 22 with respect to the four control points 24, 26, 27 and 28. This control voltage is compared with a reference voltage established by a plurality of reference potentiometers 33 to 40. By comparing the voltage across the potentiometer contained within the sending unit 29 with the reference voltage established on the appropriate potentiometer of controller 31, a control signal is generated and supplied to the switching circuitry 41 by way of the cable 42. The switching circuitry then changes the angular disposition of the swash plate by way of a mechanical coupling 43. It should be noted that the controller 31 is provided with an input cable 44 which is connected to an appropriate AC or DC source to supply the required voltage for establishing the reference voltages on the various potentiometers 33 to 40.

Figure 2:
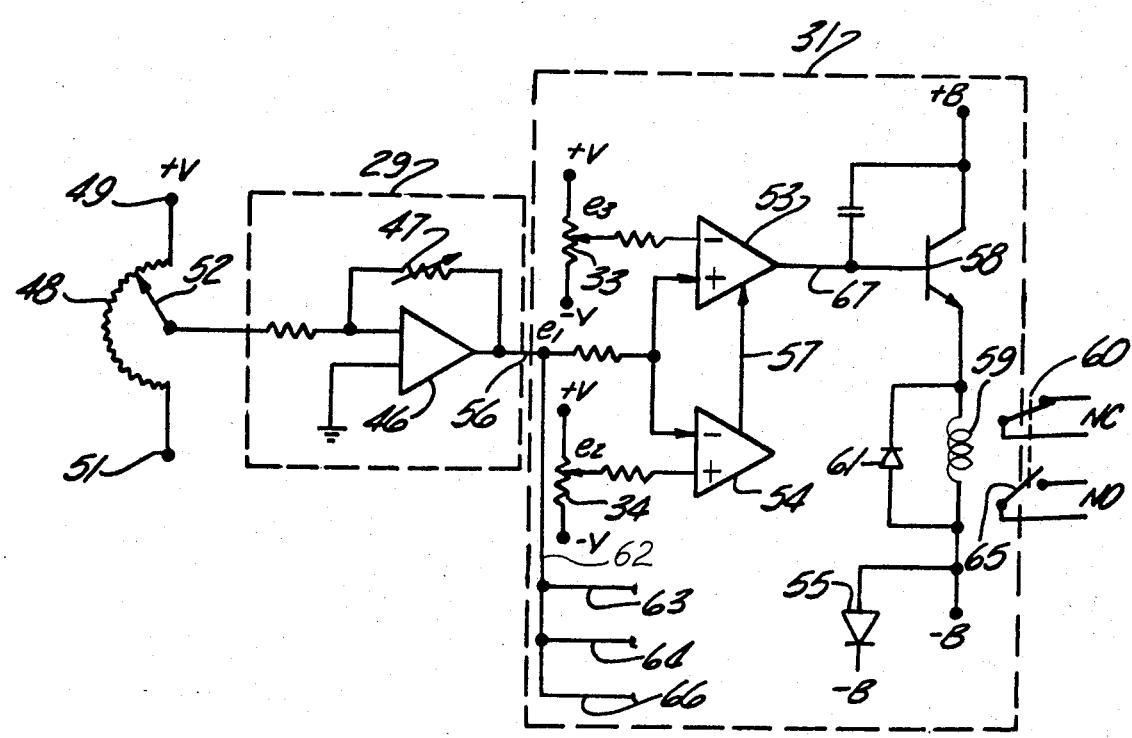
FIG. 2 is one embodiment of the position and velocity control system of the present invention.

As shown in FIG. 2, the sending unit 29 includes an operational amplifier 46 having a unity gain. An adjustable bypass resistor 47 is associated with the amplifier 46. This combination of elements permits accurate adjustment of the system when initially establishing the start and stop points.

The amplifier 46 receives an input from a potentiometer 48. A plus voltage terminal 49 and a minus voltage terminal 51 are respectively connected to opposite ends of the potentiometer 48. The plus and minus voltages can be of equal but opposite magnitudes; or, alternatively, the minus voltage can be zero and the plus voltage at a preselected positive value. The potentiometer 48 is swept by a wiper arm 52 which is mechanically coupled to either the gear 18 or the hydraulic motor 14. The wiper arm 52 therefore sweeps the potentiometer 48 and is indicative of the position of the load 22 along the path of travel of the load 22.

The output of the amplifier 46 serves as an input to two operational amplifiers 53 and 54 by way of line 56. The amplifier 53 also receives an input from a potentiometer 33 which, as illustrated in FIG. 1, establishes the reference voltage for the start point 24. For this reason, upon initial set up of the system, the load 22 is physically positioned at the start point 24 and the potentiometer 33 is adjusted so that the voltage $e_3$ is equal to the position indicative voltage $e_1$ from the potentiometer 48.

Operational amplifier 54 receives a second input from the potentiometer 34 which, as illustrated in FIG. 1, establishes the voltage for stop point 26. Hence, upon initial set up of the system, the load 22 is physically positioned at the stop point 26 and the potentiometer 34 is adjusted until voltage $e_2$ equals voltage $e_1$ from the potentiometer 48. The point 27 at which deceleration occurs is established by potentiometer the 36 of the controller 31. Potentiometer 36 is not shown in FIG. 2, however, it would be understood that a circuit similar to that shown in FIG. 2 will include potentiometers 35 and 36. This circuit will receive the output $e_1$ of amplifier 46 over line 56. It should be noted that the voltage set onto potentiometer 35 will be a voltage which is available on the potentiometer 48 before the voltage indicative of the start point 24. The reason for this is explained hereinafter. Operational amplifiers 46, 53 and 54 are standard integrated circuits of the LM 301 type supplied, for example, by National Semiconductor Corporation.

A line 57 connects amplifiers 53 and 54 that the output of amplifier 53 is changed in accordance with changes in the input voltage $e_1$ in a manner described hereinafter.

The output of amplifier 53 is connected to the base of a transistor 58 over line 67. Accordingly, when the output of amplifier 53 is positive, transistor 58 conducts causing current flow through a coil 59 thereby opening and closing normally closed and normally open contacts 60 and 65, respectfully, which are responsive to the magnetic field caused by current flow through the coil 59. A diode 61 is connected across the coil 59 to protect against rapid voltage changes across the coil 59 upon deactuation, that is, the diode 61 provides for dv/dt suppression. A light emitting diode 55 is connected in series with the coil 59 to provide visual indication when current is flowing through the coil 59.

It should be noted that the output line 56 of amplifier the 46 is also applied to lines 63, 64 and 66 by way of line 62. Each of lines 63, 64 and 66 would provide an input to a circuit identical to that receiving the input from line 56. Accordingly, each of the pairs of potentiometers shown associated with controller 31 in FIG. 1 provides inputs to a circuit identical to that described hereinabove. These potentiometers are used to establish the various control points shown in FIG. 3.

The operation of the circuit is such that ordinarily line 67 of amplifier 53 is at −V potential; such that consequently no current flows through coil 59. When hydraulic motor 14 of FIG. 1 begins rotating, arm 52 moves along potentiometer 48 so that the voltage input to amplifier 46 is indicative of the position of load 22 along the travel path.

Assuming that initially the load 22 will be moved from left to right, the voltage $e_2$ set onto potentiometer 34 will be less than the voltage $e_3$ set onto the potentiometer 33. Also the voltage $e_2$ is greater than the position indicative voltage $e_1$ from the potentiometer 48. As the load moves, wiper arm 52 moves proportionally thereto thereby increasing voltage the $e_1$ which is input to the amplifiers 53 and 54. When $e_1$ equals $e_2$, the output line 57 of the amplifier 54 becomes positive causing a positive output from the amplifier 53 on line 67. The positive voltage on line 67 causes the transistor 58 to conduct and current passes through coil 59 actuating the relay which is responsive to the coil 59. Current continues to flow through the coil 59 until $e_1$ becomes greater than the voltage $e_3$ input to the amplifier 53. When this occurs, amplifier 53 no longer conducts and the relay coil 59 is deenergized causing contact 65 to open. When the voltage $e_3$ represents stop point 26, the motion of the motor is stopped. For the other circuits the motor will be decelerated, etc.

Figure 3:
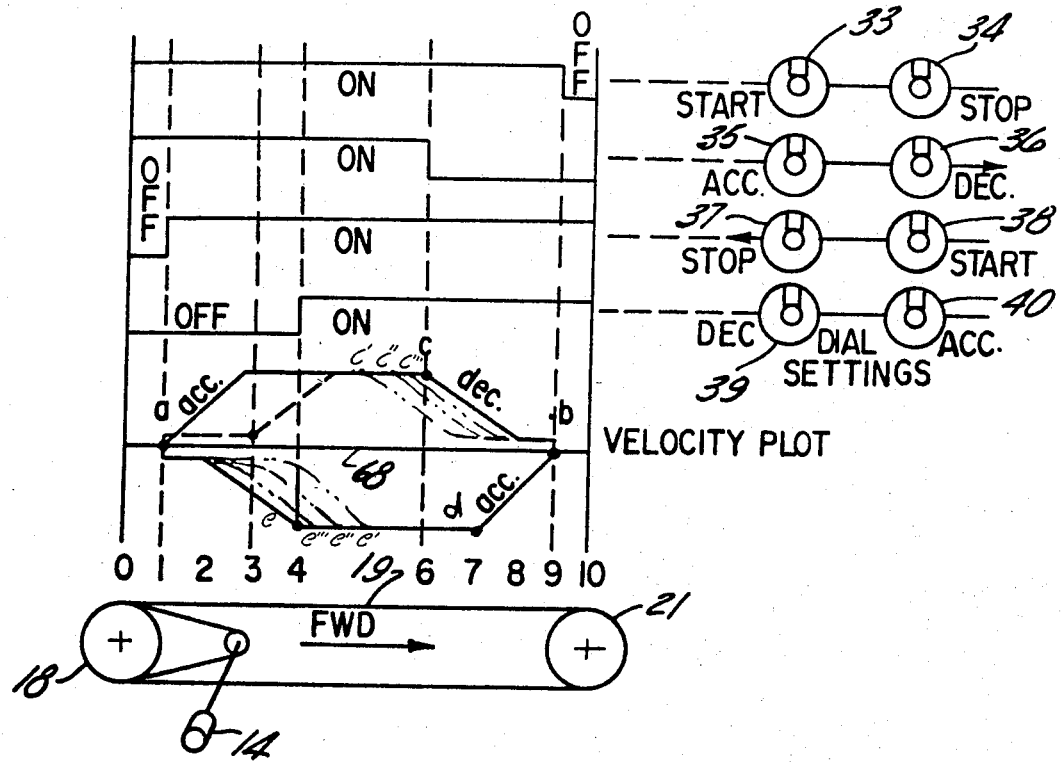
FIG. 3 illustrates the various motion control points which are effected by the position and velocity control system of the present invention.

A more complete understanding of the motion control of the load can be gained by viewing FIG. 3. This Figure, above line 68, shows a graph of the velocity movement from left to right and the acceleration and deceleration points along the motion path. The graph below line 68 shows the motion and the associated control points going from right to left.

For forward motion, that is from left to right, assume that the load is positioned at point a. The load 22 is physically placed at this position and potentiometer 48 yields a voltage $e_1$ indicative of this position. When fluid flow to motor 14 commences, the motor begins accelerating at a rate determined by the mechanical operation of the swash plate which controls the fluid flow and hence also controls the speed of hydraulic motor 14. Motor 14 therefore accelerates up to a velocity which is determined by the mechanical settings 43 on fluid flow varying mechanism 13 in a conventional manner. The motor continues running at a constant speed until point c is reached. This point is determined by the setting on potentiometer 36 in a manner described above. Hence, when point c is reached, the amplifier corresponding to amplifier 53 causes a transistor corresponding to transistor 58 to conduct and a switch is actuated resulting in mechanical coupling 43 changing the angular position of the swash plate. The velocity of the motor is therefore decelerated until a minimum speed is reached. The deceleration curve and the minimum speed are dependent upon the characteristics of the fluid varying mechanism 13 and are independent of the inventive control system. Upon reaching the minimum speed, the velocity continues at that speed until the selected stop point b is reached. This point is determined by the setting on potentiometer 34 so that the load is accurately positioned at the selected point.

For convenience, the velocity diagram in the reverse direction (right to left) is shown beneath that for the forward direction. The hydraulic motor is accelerated along the acceleration line in accordance with the characteristics of the hydraulic system until point d is reached at which time the motor runs at a constant speed until point e is reached. Point e is determined by the setting on potentiometer 39 and accordingly can be varied at will simply by varying the setting on potentiometer 39. Upon reaching point e the motor is decelerated, in accordance with the characteristics of the hydraulic system, until it reaches a minimum speed. Motion continues at the minimum speed until point a is reached and the motor is stopped. It should be noted that point a is the start point for motion in the left to right direction.

Figure 4:
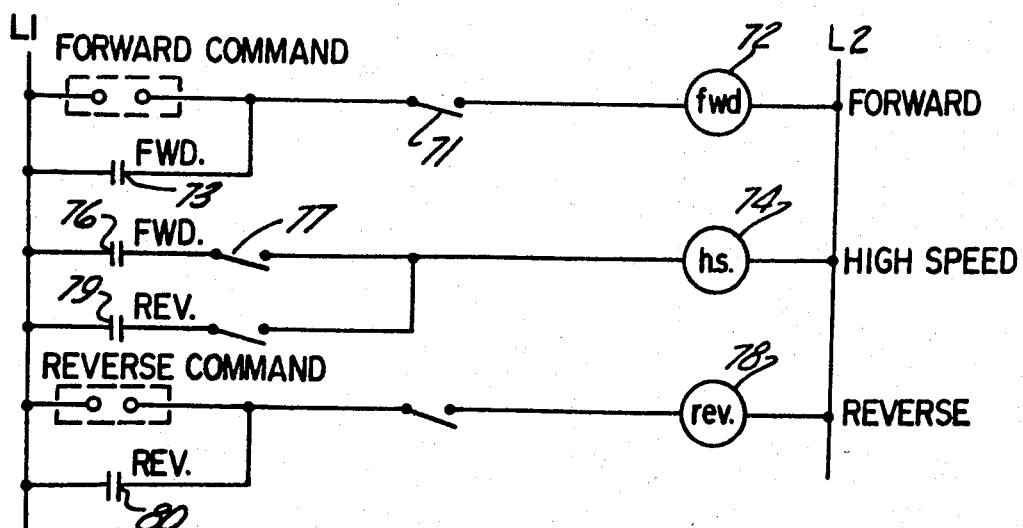
FIG. 4 is a exemplary switching connection which may be used in conjunction with the position and velocity control system of the present invention.

The operation of a control circuit which can be used with the inventive system is shown in FIG. 4.

A forward command signal is received which energizes the forward solenoid 72 via the Forward Start-Stop switch 71. Current through the forward solenoid 72 causes forward contacts 73 to close and the system runs until solenoid 72 is deenergized. The high speed solenoid is energized via the forward solenoid contact 76 and the Forward Acceleration-Deceleration switch. Contacts 76 are held closed by solenoid 72.

The load 22 will now accelerate to maximum speed in the forward direction until point c is reached. At this point the forward acceleration-deceleration switch 77 opens which de-energizes the high speed solenoid 74, and the load will decelerate to minimum speed in accordance with the characteristics of the hydraulic system. When the load reaches point b the forward start-stop switch 71 opens de-energizing the forward solenoid 72 and stopping the load at point b.

The same occurs when the reverse command signal is given. However, the load will move from point b at high speed to point e and will stop at point a.

Figure 5:
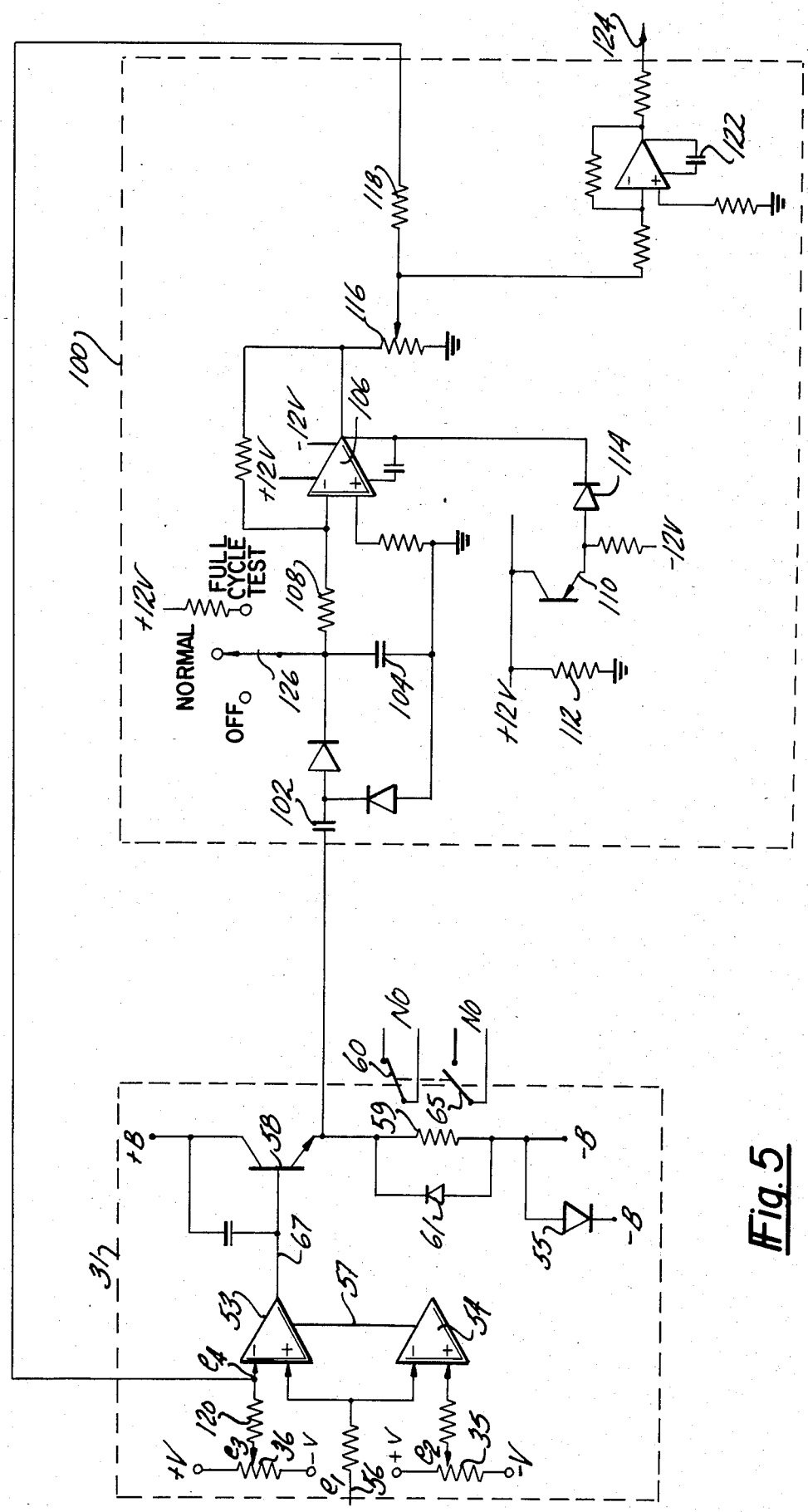
FIG. 5 is a preferred embodiment of the position and velocity control system with cold start compensation.

Referring now to FIG. 5, there is depicted a cold start compensation circuit 100 which functions to advance the deceleration point of the movable member for a predetermined period of time after initial start up or restart of the control system. The cold start compensation circuit 100 is connected to the controller 31 which includes amplifiers 53 and 54 and two adjustable potentiometers 35 and 36 which operated in the manner described above to control the acceleration and deceleration points of the driven member along its path of movement. The cold start compensation circuit 100 includes means for incrementally varying one of the first and second reference voltage levels for a predetermined period of time after energization of the controller 31 so as to vary one of the first and second arbitrarily selected locations along the path of the driven member where a change in velocity of the driven member occurs.

Preferably, the means for incrementally varying one of the first and second reference level voltages includes voltage step means in the form of a capacitive step counter formed by capacitors 102 and 104. Capacitor 102 is connected to the emitter of the transistor 58 in controller 31 which is energized once during each cycle of the control system. The repetitive on and off cycling of the transistor 58 causes a charge to be built up by on the capacitor 102 which, in turn, discharges through capacitor 104 to build up a charge on the capacitor 104. Thus, an increasing voltage is applied to the inverting input of an operational amplifier 106 through a resistor 108 which is connected to the capacitor 104. The non-inverting input of the operational amplifier 106 is connected through a resistor 108 to capacitor 104. The non-inverting input of the amplifier 106 is also connected through a resistor to ground. In this manner, for every cycle or on and off switching of the transistor 58, an increased voltage will be present at the output of amplifier 106.

The maximum voltage level which is output for the amplifier 106 is limited by a limiting circuit including a transistor 110 which has its base connected to a potentiometer 112. The emitter of the transistor 110 is connected through a diode 114 to the amplifier 106 and functions to limit the maximum voltage which is output from the amplifier 106.

A potentiometer 116 is connected to the output of the amplifier 106 and functions to select a predetermined amount of each step voltage increase in the output of the amplifier 106 which is input to the controller 31. In this manner, the amount of increment of the deceleration point can be matched to suit a particular load, environment, drive size and duty cycle of a particular application.

The output of the potentiometer 116 is connected through a resistor 118 to the input of amplifier 53 in the controller 31. Thus, the portion of the voltage output from the amplifier 106 which is selected by the potentiometer 116 is summed at the input terminal of the amplifier 53 with the reference voltage provided by potentiometer 36 which determines the deceleration point of the driven load along its path of movement, as described above. Resistor 118 and resistor 120 connected to the potentiometer 36 form a resistor divider network which functions to lower the voltage input to the amplifier 53 when the cold start compensation circuit is initially energized and to incrementally increase the voltage applied thereto during repeated cycles of the control system.

As described previously, the controller 31 functions to energize the transistor 58 and the relay coil 59 connected thereto when the voltage $e_1$ on line 56 from the sending unit 29 is greater than the voltage $e_2$ provided by potentiometer 35 and is less than the voltage provided by potentiometer 36. Thus, the output relay 59 will remain energized as long as voltage $e_1$ is between voltages $e_2$ and $e_3$.

In utilizing the controller and cold compensation network 100 depicted in FIG. 5 to incrementally advance or vary the deceleration point of the driven member, potentiometer 36 is utilized to select the point of deceleration and potentiometer 35 is associated with the start position of travel of the driven member. Thus, as the hydraulic system is energized and is in a high speed state from the start position, the potentiometer 35 will be moved to a zero resistance position or tied directly to $-12$ V. In this manner, the voltage $e_1$ from the sending unit 29 will always be greater than the voltage $e_2$ provided by potentiometer 35 so as to energize the output of the controller 31 immediately from the start position. The output will remain energized until voltage $e_1$ equals or exceeds voltage $e_4$ provided at the input terminal of the amplifier 53.

In a typical system, as illustrated in FIG. 1, the capacitors 102 and 104 in the cold start compensation circuit 100 will be selected to provide approximately fifty incremental voltage steps to the amplifier 106. Further, the potentiometer 36 will be moved to provide a final or normal deceleration point which corresponds to point C on the graph depicted in FIG. 3. Thus, when the control system is initially energized, or restarted after a lengthy down time, the voltage $e_4$ provided by the summing network of the output of the cold start compensation circuit 100 and the output of the potentiometer 36 will be less than the voltage associated with the normal deceleration point. Thus, the voltage $e_4$ provided by the summed voltages of the cold start compensation circuit 100 and the potentiometer 36 will be less than the output voltage from the potentiometer 36 so as to reduce the voltage input to the amplifier 53 such that voltage $e_1$ provided from the sending unit 29 on line 56 will equal or exceed the voltage $e_4$ at an earlier point along the travel of the driven member along its path of movement, as denoted by c' in FIG. 3. During repeated cycles, the step counter formed by capacitors 102 and 104 in the cold start compensation circuit 100 will incrementally apply an increased voltage to the amplifier 106 whose output will correspondingly incrementally increase. This results in a incrementally increasing voltage being applied to the input of the amplifier 53 in the controller 31 so as to incrementally move the deceleration point from an initial point C' through points C", C''' to the final normal deceleration point C.

When the final deceleration point c has been reached, the output of the amplifier 106 will remain at a constant voltage by means of the limiter circuit which includes transistor 110 and potentiometer 112. However, the capacitor counter formed by capacitors 102 and 104 continues to provide increased voltage to the input of the amplifier 106. If the control system is deenergized, capacitor 104 will discharge through resistor 108 in a conventional manner so as to exponentially lower the voltage input to the amplifier 104. If, when the control system is reenergized, the voltage input to the amplifier 106 is less than the maximum voltage determined by limiter circuit, the cold start compensation circuit 100 will again be energized to incrementally advance the deceleration point of the control system. If the off time is relatively short, such as a few hours, only a portion of the incremental advancing of the deceleration point will be provided rather than the entire amount of deceleration point advancing provided from a cold or initial start condition.

As shown in FIG. 5, the cold start compensation circuit 100 includes an inverter 122 which functions to invert the output voltage from the potentiometer 116. The output of the inverter 122 is connected to a cold circuit identical to control circuit 31 to provide deceleration point incremental advancement through points e', e" and e''' during movement of the driven member from right to left as viewed in FIG. 3.

Finally, the cold start compensation circuit 100 includes a control switch 126 which is switchable between a plurality positions labelled "Off", "Normal" and "Full Cycle Test". The "Full Cycle Test" position is connected through a resister to +12 V to instantly charge capacitor 104 its full voltage level. The remaining positions provided by the switch 126 provide for a normal operation of the cold start compensation circuit 100 and a de-energization or off state.

Thus, there has been disclosed a position and velocity control system having cold start compensation. The position and velocity control system functions to incrementally vary the deceleration point of a driven member along its path of movement for a predetermined period of time after the control system is energized or restarted after a lengthy off time. In this manner, the slower response time of the hydraulic or mechanical control members of the control system which move the driven member along its path of movement is compensated for to avoid damage and wear on the control system and driven member.

What is claimed is:

1. In a system for controlling the extent of movement of a movable member with respect to a fixed member and for effecting velocity changes at arbitrarily selected locations along the path of movement of the movable member during each cycle of the system, the system including means for providing a variable voltage which varies in direct relationship with the position of the movable member, first and second means for providing first and second reference voltages, respectively, which provide a voltage level representative of first and second arbitrarily selected locations on the path of movement of the movable member along the fixed member where first and second changes in velocity occur, first and second voltage comparison means each receiving the variable voltage as one input and one of the first and second reference voltages as another input, respectively, and generating comparison signals when the variable voltage and one of the first and second reference voltages are substantially equal and utilization means, responsive to the comparison signals, for changing the velocity of movement of the movable member a first time when the first comparison means yields the comparison signal and for changing the velocity of the movable member a second time when the second comparison means ceases provision of the comparison signal, the improvement comprising:

means for incrementally varying one of the first or second reference voltage levels for a predetermined period of time after energization of the system so as to vary one of the first and second arbitrarily selected locations along the path of movement where a change in velocity of the movable member occurs, the incrementally varying means being responsive to successive cycles of the systems after energization of the system and including:

amplifier means for providing a voltage output, the output from the amplifier means being connected as an input to one of the first and second means for providing first and second reference voltages; and voltage step means, responsive to the cycling of the system, for providing an incrementally increasing voltage to the amplifier means so as to incrementally vary its output.

2. The improvement of claim 1 wherein:

the first arbitrarily selected position represented by the first reference voltage of the first means is the start position of movement of the movable member in a first direction with respect to the fixed member;

the second arbitrarily selected position represented by the second reference voltage of the second means is the start point of deceleration of the movable member; and the incrementally varying means including an output, the output being connected to the second means for providing the second reference voltage so as to incrementally vary the second reference voltage.

3. The improvement of claim 1 wherein:

the incrementally varying means includes time means, responsive to the amount of time of non-movement of the movable member between successive cycles of the system, for re-activating the incremental varying means if the system has been de-energized for a predetermined period of time.

4. A system for controlling the extent of movement of a movable member with respect to a fixed member and for effecting velocity changes at arbitrarily selected positions along the path of movement, of the movable member, comprising:

means for providing a variable voltage, the variable voltage varying in direct relationship with the position of the movable member;

first means for providing a first reference voltage, the first reference voltage providing a level representative of a first arbitrarily selected position along the path of movement of the movable member where a first change in velocity occurs, the first arbitrarily selected location representing the start point of movement of the movable member;

first voltage comparison means receiving the variable voltage and the first reference voltage and generating a first comparison signal when the variable voltage and the first reference voltage are substantially equal;

second means for providing a second reference voltage, the second reference voltage providing a level representative of a second arbitrarily selected location along the path of the movable member where a second change in velocity occurs, the second arbitrarily selected location representing the start point of deceleration of the movable member;

second voltage comparison means receiving the variable voltage and the second reference voltage, the second voltage comparison means being responsive to the first comparison signal to provide an output actuation signal, the second comparison means ceasing the provision of the actuation signal when the variable voltage substantially equals the second reference voltage;

means for incrementally varying the second reference voltage for a predetermined period of time after energization of the system, the incrementally varying means being operative to initially lower the second reference voltage during repeated cycles of system, the incrementally varying means being responsive to successive cycles of the system after energization of the system and including:

amplifier means for providing a voltage output, the output from the amplifier having connected as an input to one of the first and second means for providing first and second reference voltages; and voltage step means, responsive to the cycling of the system, for providing an incrementally increasing voltage to the amplifier means so as to incrementally vary its output; and utilization means, responsive to the actuation signal, for changing the velocity of movement of the movable member when the first comparison means yields the first comparison signal and stopping movement of the movable member when the second comparison means ceases provision of the actuation signal.

* * * * *